July 26, 1966  G. K. C. HARDESTY  3,262,224
COMPOSITE ILLUMINATION DEVICE
Original Filed Dec. 7, 1960

INVENTOR.
G. K. C. HARDESTY
BY
ATTY

United States Patent Office 3,262,224
Patented July 26, 1966

3,262,224
COMPOSITE ILLUMINATION DEVICE
George K. C. Hardesty, P.O. Box 156, Mayo, Md.
Original application Dec. 7, 1960, Ser. No. 74,438. Divided and this application Sept. 29, 1964, Ser. No. 404,546
2 Claims. (Cl. 40—130)

The present application is a divisional application of applicant's co-pending application Serial No. 74,438, filed December 7, 1960.

The invention described herein may be manufactured and used by or for the Government of the United States of America for governmental purposes without the payment of any royalties thereon or therefor.

The present invention relates to panel illumination and more particularly to the illumination of control console indicators under conditions running from near or total darkness to high ambient illumination.

Many critical equipment failures or other emergency conditions can result from the complexities of modern aircraft, shipboard, and missile control equipment. To protect the ship or aircraft or missile and the personnel who must work around it continuous monitoring and alarm systems have been progressively developed. Several types of these monitoring and alarm systems employ audible signals to attract attention of personnel but in some instances there is difficulty in providing distinctively different audible signals for each of the monitors. In other instances, in the submarine, audible signals must be silent for long periods and reliance placed on silent warning signals. Available visual signals, however, do not cover the necessary range of application needs. There is little available to the ship or aircraft designer between the "pilot" or "indicator light" and the large rotating flashing signals of the familiar police squad car or ambulance. Conspicuous, attention demanding, legend displays, which are compact and inexpensive, are needed to provide many shipboard and shore installations with adequate monitor warning signal systems.

Many types of indicator lights and panel illumination devices have been suggested for use on control consoles. The failure of many existing indicator displays to be discernible in high ambient illumination has been the cause of much concern in both shipboard and aircraft situations. When a number of conventional indicator lights are grouped together, the total array is too bright for comfort for near-dark adaptation viewing. Further, the full significance of the light being energized is often a matter of training and memory because it has not been possible heretofore to read the legends on nearby nameplates with prevalent ambient illumination. Some dim-out cap assemblies utilize back-lighted, stencilled, legend discs but their use entails a sharp reduction of maximum brightness that depreciates the effectiveness of the signal, particularly in the higher ambient illumination now prevalent in new submarine construction. Translucent signal panels have in the past been rear illuminated by lamps placed behind the panel. However, such attempts at rear illumination invariably have resulted in uneven ineffective illumination if the lamps are placed close to the rear panels, or vastly reduced brightness if the lamps are sufficiently removed from the panels to result in reasonably uniform brightness. It should also be noted that in some instances, sufficient space is not available behind the console panel for removal of these lamps in case of lamp failure.

The present invention permits efficient presentation of displays which are particularly suitable for use in high ambient illumination conditions. The underlying optical system is capable of use with various types of illumination sources with greater efficiency in both power and space than was possible with most prior art devices.

The illumination provided by this invention achieves uniform high brightness displays that are suitable for use in control and monitoring applications where the uneven, ineffective displays which were prevalent in many prior art devices are virtually useless. These advantages are provided basically by a closed-loop or reentrant optical circuit wherein the light source is shielded from the indicia to be illuminated by an opaque barrier. In accordance with the invention, light from the light source is carried around the opaque shield, in accordance with the laws of total internal reflection, by a transparent light transmitting element.

Accordingly, it is an object of the present invention to provide an improved illuminated signal device adequate for use under conditions of high ambient illumination as well as under conditions of near or total darkness.

Another object is the provision of a system for effecting local zones of rear illumination in translucent signal panels with the result that uniform brightness symbols on the panels may be selectively illuminated in accordance with the needs of a monitoring or control equipment.

A further object of the invention is to provide a small illuminated-legend, indicating module capable of presenting information without the need for auxiliary nameplate interpretation.

Still another object is the provision of a legend display which will be conspicuous, attention demanding, compact, inexpensive, and optionally capable of presenting the displayed information in a series of coded colors.

Other objects and many of the attendant advantages of this invention will be readily appreciated as the same becomes better understood by reference to the following detailed description when considered in connection with the accompanying drawings wherein.

Figure 1:
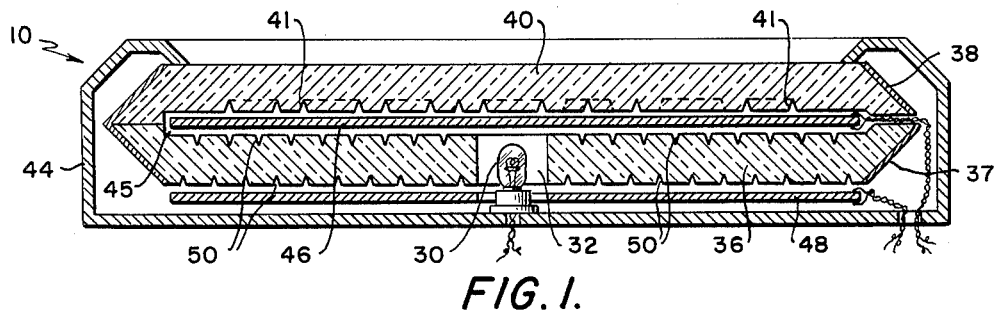
FIG. 1 is a sectional view of one embodiment of the present invention.

Referring now to FIG. 1, there is shown an embodiment of the invention in the form of a display device 10 wherein a plurality of different types of light sources are utilized. The display device 10 comprises a light source in the form of lamp 30 mounted in an aperture 32 in a light input panel 36 having a reflective beveled edge 37 cooperating with the reflective beveled edge 38 on an edge lighted display element 40. On display element 40 are provided a number of engraved indicia 41. The assembly of elements 36 and 40 is held in an enclosing housing or light shield 44 which may be mounted on any suitable control panel. In a cavity 45 defined between the elements 36 and 40 there is provided an electroluminescent element 46 which has its light emitting side facing the light input element 36 and also has a black coating on the surface facing the edge lighted display element 40. The black coating on the electroluminescent element 46 serves as an opaque light barrier which prevents light from passing from the lamp 30 directly through display element 40.

A second electroluminescent light source 48 is placed adjacent the opposite face of light input element 36 with its light emitting side also facing element 36. Provided on both faces of light input element 36 are a plurality of engraved light diffusing facets 50 which are designed to direct the light emitted from the electroluminescent sources through the reentrant light circuit of the lamp, i.e., light input element 36 and edge lighted display element 40, whereby substantially all of the light emitted from both electroluminescent sources and lamp source 30, except for that portion of the light flux which is caused to be emitted from the lamp by indicia 41, will be continuously reflected between the reflective faces of both elements. If desired, the inside of the housing and light shield 44 may be coated with a light reflective paint. It will also be realized that light diffusing facets 50 may be metalized if desired to enhance the reflective capability.

Figure 2:
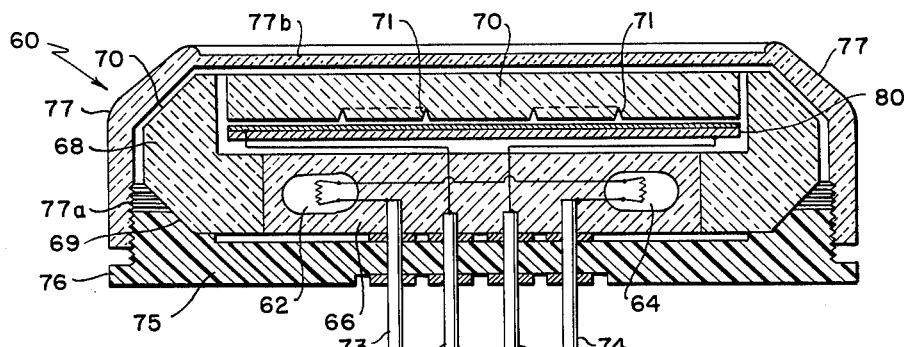
FIG. 2 is a sectional view of a modified device similar in concept to FIG. 1.

Referring now to FIG. 2 there is shown an embodiment of the invention in the form of a circular, plug-in, indicator module 60. The module of FIG. 2 comprises a pair of light sources 62, 64. The light sources 62, 64 are encapsulated directly or by means of a transparent gel or highly viscous fluid in a clear light transmitting element 66 which is mounted for cooperation with a light carrying element 68, having reflective beveled edges 69, 70 for transmitting light from sources 62, 64 to an edge lighted display element 70 having engraved indicia 71 to be illuminated. The elements 66, 68 may be considered together as a light input element of a light recirculating circuit including the display element 70.

The light sources 62, 64 are connected by suitable conductors for energization by connecting a voltage source across prongs 73, 74 which project through a wall 75 of a support member 76. The elements 66, 68, and 70 are housed as an assembly by the support member 76 and a combined bezel, body and window member 77 which is threadedly secured at 77a to the support member and includes a window portion 77b overlying the display element 70. In addition to lamps 62, 64, there is provided an electroluminescent panel 80 which is designed to provide a directly lighted field behind element 70 against which the indicia will be silhouetted for low ambient viewing. It further serves as a light barrier to eliminate any direct lighting of indicia element 70, by lamp sources 62 and 64. Additionally, the electroluminescent lamp forms a visual background for the high luminence level edge lighted symbols or indicia 71 of the display element 70 when lamps 62 and 64 are energized instead of the electroluminescent lamp. Thus, the electroluminescent lamp may be utilized to display the total area of the viewing window or alternatively may be used to display merely a masked off portion forming an alternate symbol to be viewed under conditions of low ambient illumination. The electroluminescent lamp 80 is connected by suitable conductors, as illustrated, to prongs 81, 82 to which suitable electrical power may be applied to energize the lamp 80 to a luminescent state.

Figure 3:
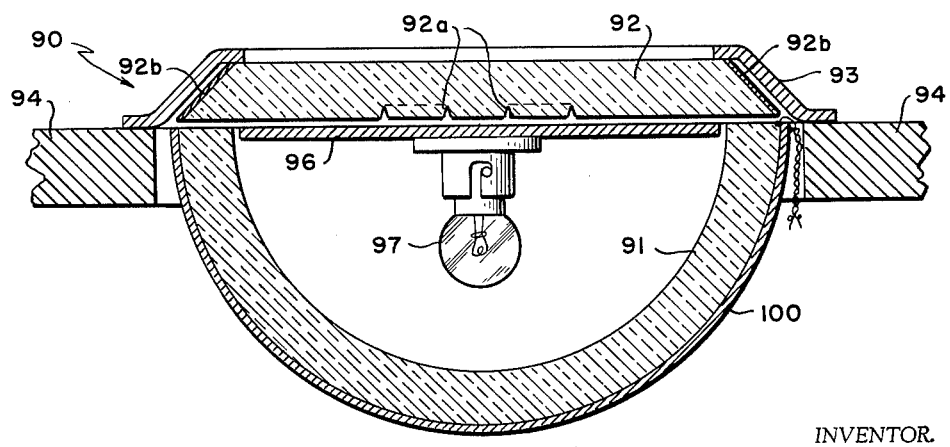
FIG. 3 is a sectional view of another embodiment of the invention.

FIG. 3 shows an embodiment 90 similar in many respects to that shown in FIG. 1 but wherein a cylindrical or hemispherical element 91 is interchanged with the disc or rectangular shaped light input element 36 of FIG. 1. As shown in FIG. 3 light input element 91 is cylindrical or hemispherical and is designed to cooperate with the edge lighted display element 92 which is held in place by a bezel 93 on a console panel 94. The display element 92 is provided with engraved indicia 92a to be illuminated, and beveled, internally reflective edges 92b. Mounted within cylindrical or hemispherical light input element 91 is an opaque light barrier 96 upon which is mounted light source 97. An electroluminescent panel 100 having its light emitting side facing the front of the assembly is mounted around the periphery of light input element 91 or may be an integral part of input element 91. If separate it may be more effectively coupled optically to element 91 by a transparent gel or viscous fluid. It will again be realized in this embodiment that in place of a lamp source 97 there may be a fluorescent tube or if element 91 is a cylindrical rather than hemispherical shape, linear sources of light such as the linear tungsten "Lumiline" lamp or the "Aperture" flourescent lamp recently developed by Sylvania Electric Products may be used as a light source. As required to divert light rays for total internal reflection within element 91, prismatic surface interruptions similar to 50 of FIG. 1 would be provided in one or both surfaces of element 91.

Obviously many other modifications and variations of the present invention are possible in the light of the above teachings. It is therefore to be understood that within the scope of the appended claims the invention may be practiced otherwise than as specifically described.

I claim:
1. An indicator illumination system comprising an incandescent lamp as a first light source and at least one electroluminescent element as a second light source, indicia to be illuminated, said electroluminescent element comprising an opaque light shield on one surface thereof and interposed between said light sources and said indicia to prohibit direct lighting of said indicia by said light sources, a reentrant light conducting circuit extending from said light sources to said indicia whereby light entering said circuit from said light source is conducted through said circuit to illuminate said indicia and is recirculated through said circuit to enhance the illumination, said reentrant light conducting circuit comprising a first light conducting element into which light from said light sources is injected, and a second light conducting element for carrying illumination to said indicia and cooperating with said first light conducting element to receive light therefrom, and one of said light conducting elements having light reflective facets adapted to carry light around said opaque light shield.

2. An indicator illumination system comprising an incandescent lamp as a first light source and at least one electroluminescent element as a second light source, indicia to be illuminated, an opaque light shield interposed between said light sources and said indicia to prohibit direct lighting of said indicia by said light sources, a reentrant light conducting circuit extending from said light sources to said indicia whereby light entering said circuit from said light sources is conducted through said circuit to illuminate said indicia and is recirculated through said circuit to enhance the illumination, said reentrant light conducting circuit comprising a first light conducting element into which light from said light sources is injected, and a second light conducting element for carrying illumination to said indicia and cooperating with said first light conducting element, said second light conducting element having light reflective facets adapted to carry light around said opaque light shield, said first light conducting element being semi-circular in section, and said electroluminescent light source being disposed over the outer surface of said first light conducting element.

References Cited by the Examiner

UNITED STATES PATENTS

| 2,561,881 | 7/1951 | Oetting | 40—130 |
| 2,906,048 | 9/1959 | Kraus | 40—130 X |
| 2,916,011 | 12/1959 | Molis | 240—1 X |
| 2,945,145 | 7/1960 | Neugass | 313—108 |
| 2,953,668 | 9/1960 | Bassett | 240—1 X |
| 3,083,317 | 3/1963 | Fish et al. | 40—130 X |

FOREIGN PATENTS

| 125,229 | 8/1947 | Australia. |
| 816,795 | 5/1937 | France. |
| 1,047,713 | 7/1953 | France. |
| 1,186,348 | 2/1959 | France. |
| 402,825 | 12/1933 | Great Britain. |

WALTER A. SCHELL, *Primary Examiner.*

IRVING BUNEVICH, *Examiner.*

CLYDE I. COUGHENOUR, *Assistant Examiner.*